(12) United States Patent
Germata

(10) Patent No.: US 8,296,915 B1
(45) Date of Patent: Oct. 30, 2012

(54) EXTERNAL REPAIR METHOD FOR IN-SERVICE LEAKING FLUID CONDUITS AND CONTAINERS

(75) Inventor: Daniel Thomas Germata, Waukegan, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 13/269,666

(22) Filed: Oct. 10, 2011

(51) Int. Cl.
*B23P 6/00* (2006.01)
(52) U.S. Cl. ............... 29/402.01; 29/402.09; 29/402.13; 29/402.18; 29/527.2
(58) Field of Classification Search ............... 29/402.01, 29/402.09, 402.13, 402.14, 402.18, 527.2
See application file for complete search history.

(56) References Cited

U.S. PATENT DOCUMENTS

| | | | |
|---|---|---|---|
| 1,831,641 | A | 11/1931 | Skinner |
| 4,015,634 | A | 4/1977 | Christie |
| 4,123,092 | A | 10/1978 | Colbert, Jr. |
| 4,485,847 | A | 12/1984 | Wentzell |
| 4,591,191 | A | 5/1986 | Fournie et al. |
| 4,603,463 | A | 8/1986 | Wolbert et al. |
| 4,652,023 | A | 3/1987 | Timmons |
| 4,713,870 | A | 12/1987 | Szalvay |
| 5,372,391 | A | 12/1994 | Bast et al. |
| 5,421,623 | A | 6/1995 | Cassin |
| 6,276,726 | B1 | 8/2001 | Daspit |

*Primary Examiner* — Jermie Cozart
(74) *Attorney, Agent, or Firm* — Mark E. Fejer

(57) ABSTRACT

A method for external repair of a leak in an in-service fluid containment vessel in which a fluid venting device is affixed to the outer surface of the fluid containment vessel so as to enable venting of the leaking fluid to the atmosphere during the remainder of the method steps. A composite repair material is applied over the fluid venting device and the fluid containment vessel and allowed to cure. During the curing period, fluid leaking from the fluid containment vessel is vented to the atmosphere. After curing of the composite repair material, a sealant is provided to the leak by way of the fluid venting device.

19 Claims, 3 Drawing Sheets

EXTERNAL REPAIR METHOD FOR IN-SERVICE LEAKING FLUID CONDUITS AND CONTAINERS

BACKGROUND OF THE INVENTION

1. Field of the Invention

This invention relates to a method for in situ repairing of leaks in in-service conduits or containers. In one aspect, this invention relates to a method for in-situ repairing of leaks in in-service utility pipelines. In one aspect, this invention relates to a method for in-situ repairing of leaks in in-service natural gas pipelines.

2. Description of Related Art

Mechanical couplings and fittings, e.g., tees, valves, elbows, etc. are used widely throughout the natural gas industry in association with steel, cast iron, and plastic pipelines. Mechanical couplings and fittings generally all share a similar design in that rubber seals are compressed around pipes to be plumbed to create a seal. One disadvantage of this design is the lack of substantial axial (pullout) restraint for many of the coupling and fitting designs (types). After years of service, these couplings or fittings may develop a leak due to thermal expansion\contraction of the pipeline, relaxation of the rubber seals, corrosion, or even gas composition changes. Indeed, recent failures of mechanical couplings have heightened concerns about their continued safety in natural gas distribution systems. Thus, it is desirable to have a means for remediating leaking mechanical couplings and fittings without having to remove the coupling or shut down the pipeline. It is also highly desirable to have the option of adding axial restraint at the same time. It will be appreciated that the ability to perform a repair without removing the coupling or fitting, without shutting down the pipeline, and without using bypass or cut-out methods for maintaining fluid flow would both save time and reduce costs associated with shutting down the pipeline.

Numerous methods for sealing connecting pipe sections and leaks are taught in the prior art. See U.S. Pat. No. 6,276,726 which teaches a pipe clamp closing over a leak; U.S. Pat. No. 5,372,391 which teaches an internal pipe attachment mechanism which employs a sealing assembly that is set by crushing the sealing assembly through setting of the mechanical connection between pipe sections; U.S. Pat. No. 4,713,870 which teaches insertion of an expandable sleeve into a pipe and expanding the sleeve against the pipe wall containing the leak to cover and, thus, seal the leak; and U.S. Pat. No. 4,652,023 which teaches a repair coupling employing a sealing liner having circumferential ribs which seal against the pipe wall on both sides of the leak to effectively isolate the leak. While all of these sealing methods address the problem of repairing a leak in a pipe, none of the methods results in a permanent plugging of the leak.

SUMMARY OF THE INVENTION

It is, thus, one object of this invention to provide a method for in situ repair of leaks in in-service pipelines which may be performed without shutting down the pipeline.

It is one object of this invention to provide a method for in situ repair of leaks in in-service pipelines which is applied from outside the pipeline.

These and other objects of this invention are addressed by a method for repairing a leak in an in-service fluid containment vessel comprising the steps of affixing a fluid venting device having a leaked fluid inlet in fluid communication with the leak and having a vented fluid outlet to said fluid containment vessel and covering the fluid venting device and fluid containment vessel with a composite repair material. Thereafter, the composite repair material is cured during which time fluid leaking from the fluid containment vessel is removed or vented through the fluid venting device. After curing of the composite repair material, a sealant under pressure at a higher pressure than an internal pressure of the fluid containment vessel is applied to an interior space of the fluid venting device, whereby a portion of the sealant flows into the leak. The sealant disposed in the leak is then cured, producing a repaired fluid containment vessel. Fluid containment vessels to which the method of this invention may be applied include conduits containing flowing fluids such as gas or liquid conduits as well as fluid containers. The method is suitable for use with steel, cast iron and plastic conduits or pipelines. The method may be used to repair leaks in the couplings or fittings of the conduits or pipelines as well as leaks arising in sections of the conduits or pipelines between the couplings or fittings.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY

Preferred Embodiments

Figure 1:
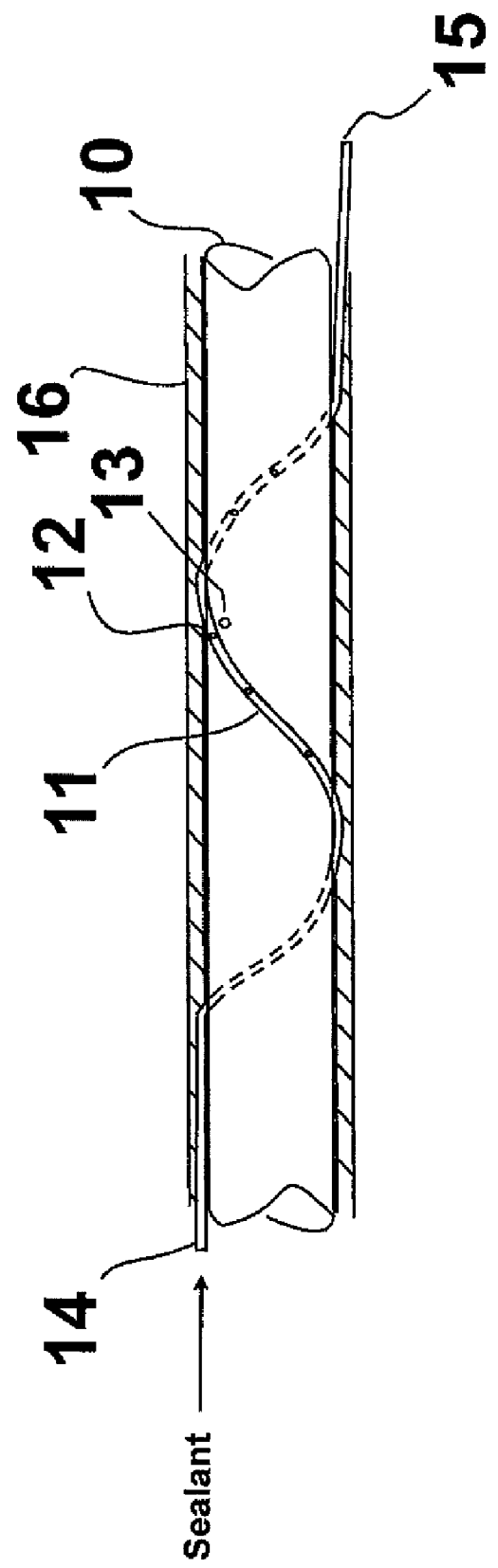
FIG. 1 is a lateral partial cross-sectional view of a conduit having been repaired using a fluid venting device in the form of a perforated tubular member in accordance with one embodiment of the method of this invention.

The invention claimed herein is a method for permanently repairing fluid leaks from in-service fluid containment vessels. As used herein, the term "in-service" refers to a fluid containment vessel which is in an operational mode. The fluid containment vessel may be in the form of a conduit or a fluid container. One example of an "in-service" fluid containment vessel to which the method of this invention may be applied is a utility pipeline through which a fluid, e.g., natural gas, is flowing. Accordingly, the method of this invention enables the repair of a leak in a natural gas pipeline through which natural gas is flowing without having to interrupt or shutdown the pipeline. In addition, the method of this invention enables the repair of a leak in a natural gas pipeline without having to install some form of bypass means to divert the natural gas around the leaking section of the pipeline to maintain the flow of natural gas in order to repair the leak. In addition to "in-service" fluid containment vessels, the method of this invention may also be applied to a pressurized fluid container having a leak through which the fluid within the container exits the container. Finally, the method of this invention may even be applied to a fluid containment vessel having an opening through which a fluid could leak but does not actually leak, such as where the internal fluid containment vessel pressure and the external fluid containment vessel pressure are in equilibrium.

In the first step of the method of this invention, a fluid venting device having a vented fluid inlet in fluid communication with the leak and having a vented fluid outlet is affixed proximate or over the leak to the outer surface of the fluid containment vessel. Thereafter, the fluid venting device and at least a portion of the fluid containment vessel are covered with a composite repair material. The composite repair material is then allowed to cure, during which curing period the leaking fluid is allowed to vent through the fluid venting device into the atmosphere. In this way, pressure buildup between the composite repair material and the fluid containment vessel is prevented while the composite repair material is curing. Once the composite repair material has fully cured, a sealant material is then introduced through the fluid venting device at a pressure greater than the internal pressure of the leaking fluid containment vessel, thereby enabling the sealant to flow through the fluid venting device and into the leaking fluid containment vessel. In accordance with one embodiment of this invention, the fluid venting device is plumbed directly to a pressurized sealant supply from which the sealant flows through the fluid venting device and into the leak. Thereafter, the sealant is allowed to cure in the fluid venting device and the leak, resulting in permanent plugging of the leak. Because it relies upon a composite "cast", the method of this invention allows for deep penetration of a sealant into any leaking feature of the fluid containment vessel independent of the geometry of the feature.

FIG. 1 is a diagrammatic representation of a fluid containment vessel in the form of a pipe undergoing repair of a leak in accordance with one embodiment of the method of this invention. As shown therein, a fluid venting device in the form of a perforated tubular member 11 having at least one perforation or leaked fluid inlet 12 in fluid communication with the leak 13 and having at least one vented fluid outlet 14, 15 is affixed to the pipe 10 by wrapping around the pipe. Disposed around the pipe and the perforated tubular member is a layer of composite repair material 16. As the composite repair material cures, the fluid escaping from the fluid containment vessel through the leak enters the perforations of the perforated tubular member, flowing through the tubular member until it is vented through the at least one vented fluid outlet. Following curing of the composite repair material, a sealant is introduced through the vented fluid outlet 14 into the tubular member. The sealant then flows through the at least one perforation 12 of the perforated tubular member and into the leak 13 after which it is allowed to cure.

Figure 2:
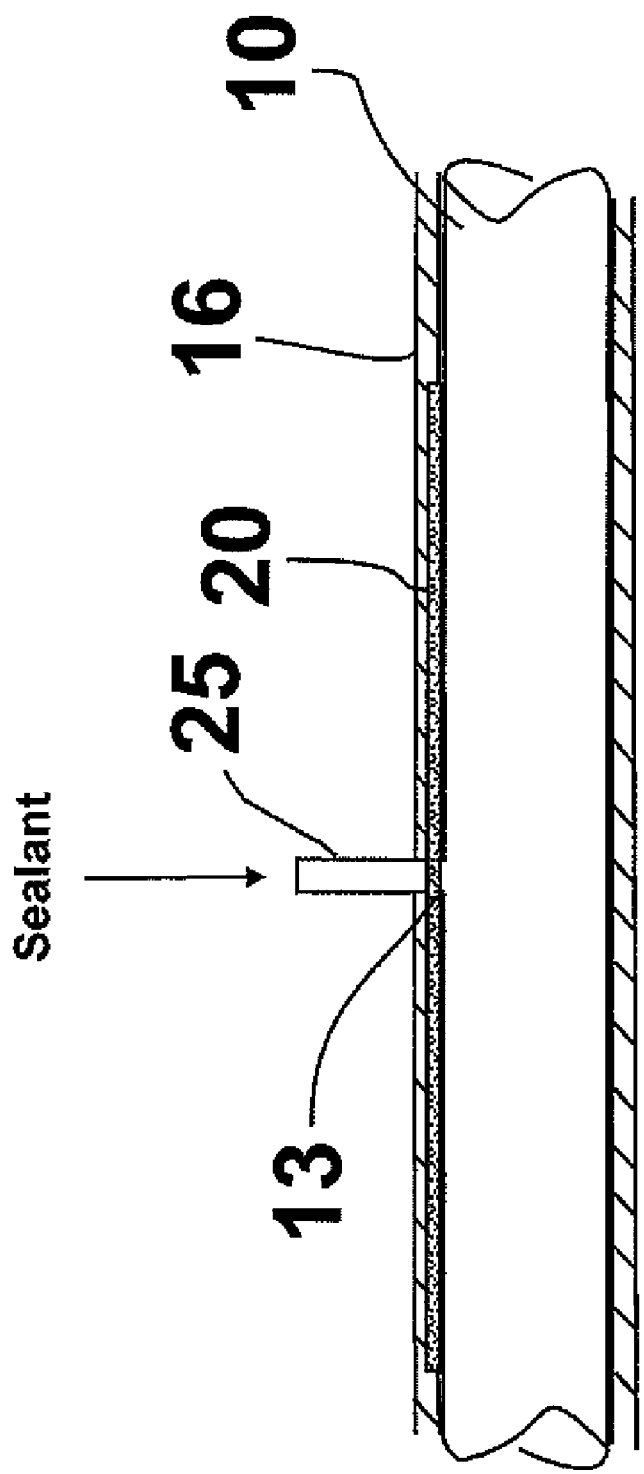
FIG. 2 is a lateral partial cross-sectional view of a conduit having been repaired using a fluid venting device in the form of a porous mat in accordance with one embodiment of this invention.

In accordance with one embodiment of the method of this invention, the fluid venting device comprises a porous mat or flow mat 20 affixed to the pipe 10 over the leak 13, as shown in FIG. 2. A composite repair material layer 16 is affixed to the pipe 10 and the porous mat 20. Thus, fluid leaking from the pipe is collected in the porous mat. A vent tube 25 having one end in fluid communication with the porous mat is provided for venting of the leaking fluid collected in the porous mat into the atmosphere. As shown, after curing of the composite repair material, sealant is introduced into the vent tube through which it may flow into and through the porous mat into the leak.

Figure 3:
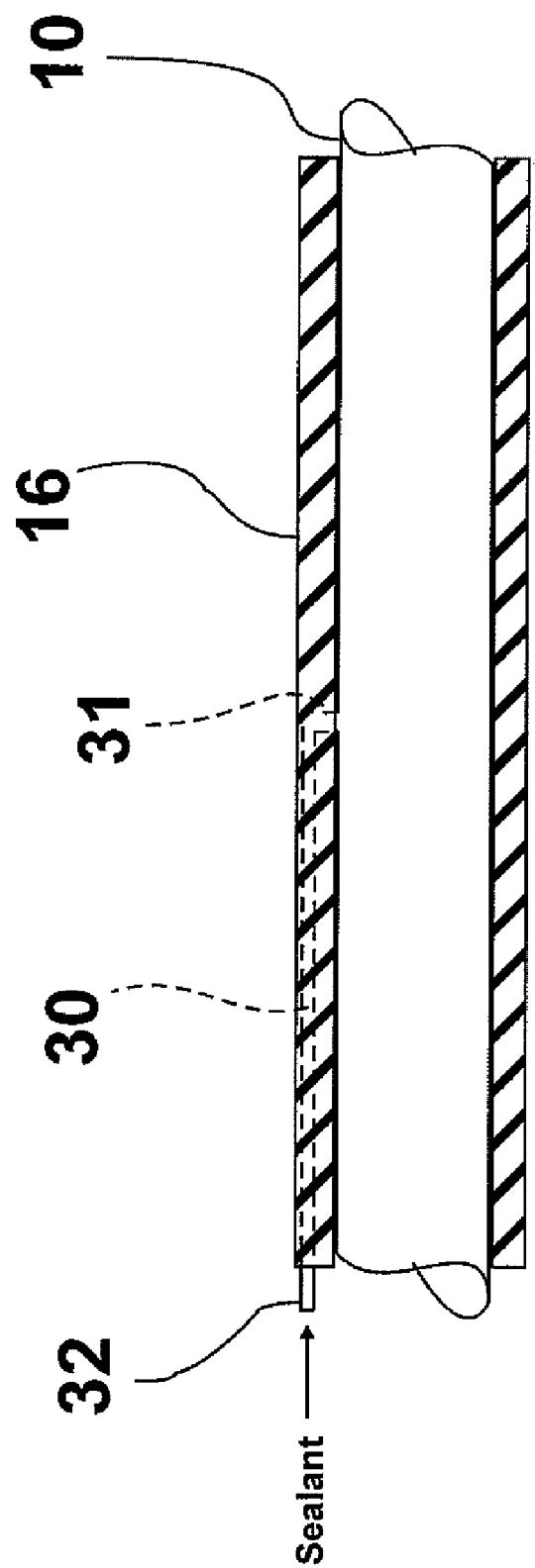
FIG. 3 is a lateral partial cross-sectional view of a conduit having been repaired using a fluid venting device in the form of a non-perforated tubular member in accordance with one embodiment of this invention.

In accordance with yet another embodiment of this invention, the fluid venting device employed is a non-perforated tubular member 30 having one end 31 affixed over the leak to the pipe as shown in FIG. 3. As a result, fluid leaking from the pipe flows directly into the non-perforated tubular member and out through vented fluid outlet 32. Once the non-perforated tubular member is affixed to the pipe, the composite repair material is applied over the tubular member and the pipe and allowed to cure. During the curing period, the leaking fluid continues to be vented through the non-perforated tubular member. Following curing of the composite repair material, a sealant is introduced through vented fluid outlet 32 into the non-perforated tubular member through which it flows directly into the leak.

Composite repair materials suitable for use in the method of this invention include, but are not limited to, glass fiber, carbon fiber, polymer fiber, and a compression wrap comprising at least one of polyurethane rubber, butyl rubber, latex, and silicone.

Sealants suitable for use in the method of this invention include, but are not limited to, polyurethanes, polyureas, urethanes, polyester resins, vinyl ester resins, epoxy resins, or other thermosetting resins.

It will be appreciated by those skilled in the art that the curing time for the composite repair material and the sealant will vary depending upon the material used. Thus, the materials may be allowed to cure naturally or curing may be promoted such as by heating of the materials.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for repairing a leak in a live fluid containment vessel comprising the steps of:
    affixing a fluid venting device having a leaked fluid inlet in fluid communication with said leak and having a vented fluid outlet to said fluid containment vessel;
    covering said fluid venting device with a composite repair material;
    simultaneously curing said composite repair material and removing fluid leaking from said fluid containment vessel through said fluid venting device;
    applying a sealant under pressure at a higher pressure than an internal pressure of said fluid containment vessel to an interior space of said fluid venting device, whereby a portion of said sealant flows into said leak; and
    curing said sealant, producing a repaired fluid containment vessel.

2. The method of claim 1, wherein said fluid venting device is a perforated tubular member having a wall forming at least one said leaked fluid inlet.

3. The method of claim 1, wherein said fluid venting device is a non-perforated tubular member with one end corresponding to said leaked fluid inlet.

4. The method of claim 1, wherein said fluid venting device is a porous mat.

5. The method of claim 1, wherein said fluid containment vessel is a conduit comprising a component selected from the group consisting of couplings, fittings, valves, threads, tees, and combinations thereof.

6. The method of claim 1, wherein said fluid containment vessel is a container.

7. The method of claim 1, wherein said composite repair material is selected from the group consisting of glass fiber, carbon fiber, polymer fiber, and compression wrap.

8. The method of claim 7, wherein said compression wrap is a material selected from the group consisting of polyurethane rubber, butyl rubber, latex, silicone, and combinations thereof.

9. The method of claim 1, wherein said sealant comprises a thermosetting resin.

10. The method of claim 9, wherein said thermosetting resin is selected from the group consisting of polyurethanes, polyureas, urethanes, polyester resins, vinyl ester resins, epoxy resins, and mixtures thereof.

11. A method for repairing a pipeline leak of an operational pipeline comprising the steps of
    covering said pipeline leak with a fluid venting device having a leaked fluid inlet and a vented fluid outlet, producing a fluid communication between said pipeline leak and said leaked fluid inlet;
    applying a composite repair material layer to said fluid venting device and said operational pipeline, producing a covered fluid venting device;
    venting leaked fluid within said fluid venting device through said vented fluid outlet;
    curing said composite repair material;
    applying a sealant to said fluid venting device at a pressure sufficient to enable said sealant to flow into and fill said pipeline leak; and
    curing said sealant in said pipeline leak, producing a repaired pipeline.

12. The method of claim 11, wherein said fluid venting device is a perforated tubular member having a wall forming at least one said leaked fluid inlet.

13. The method of claim 11, wherein said fluid venting device is a non-perforated tubular member with one end corresponding to said leaked fluid inlet.

14. The method of claim 11, wherein said fluid venting device is a porous mat.

15. The method of claim 11, wherein said composite repair material is selected from the group consisting of glass fiber, carbon fiber, polymer fiber, and compression wrap.

16. The method of claim 15, wherein said compression wrap is a material selected from the group consisting of polyurethane rubber, butyl rubber, latex, silicone, and combinations thereof.

17. The method of claim 11, wherein said sealant comprises a thermosetting resin.

18. The method of claim 17, wherein said thermosetting resin is selected from the group consisting of polyurethanes, polyureas, urethanes, polyester resins, vinyl ester resins, epoxy resins, and mixtures thereof.

19. The method of claim 11, wherein said repaired pipe is at least one of axially and structurally restrained.

\* \* \* \* \*